(12) United States Patent
Nakatani (10) Patent No.: US 10,451,143 B2
(45) Date of Patent: Oct. 22, 2019

(54) DAMPER DEVICE

(71) Applicant: EXEDY Corporation, Neyagawa-shi, Osaka (JP)

(72) Inventor: Shotaro Nakatani, Neyagawa (JP)

(73) Assignee: EXEDY CORPORATION, Neyagawa-Shi, Osaka (JP)

(*) Notice: Subject to any disclaimer, the term of this patent is extended or adjusted under 35 U.S.C. 154(b) by 278 days.

(21) Appl. No.: 15/480,600

(22) Filed: Apr. 6, 2017

(65) Prior Publication Data

US 2017/0299014 A1  Oct. 19, 2017

(30) Foreign Application Priority Data

Apr. 15, 2016  (JP) ................. 2016-081686

(51) Int. Cl.
*F16F 15/123* (2006.01)
*F16H 45/02* (2006.01)

(52) U.S. Cl.
CPC .... *F16F 15/12366* (2013.01); *F16F 15/1232* (2013.01); *F16F 2228/066* (2013.01); *F16F 2230/0005* (2013.01); *F16F 2232/02* (2013.01); *F16F 2236/08* (2013.01); *F16H 45/02* (2013.01); *F16H 2045/0226* (2013.01)

(58) Field of Classification Search
CPC ............. F16F 15/12366; F16F 15/1232; F16F 2236/08; F16F 2228/066; F16F 2230/0005; F16F 2232/02; F16H 2045/0226; F16H 45/02
USPC .................... 464/67.1, 68.8; 192/3.28, 213.2
See application file for complete search history.

(56) References Cited

U.S. PATENT DOCUMENTS

| | | | | |
|---|---|---|---|---|
| 1,071,946 A | * | 9/1913 | Morse | F16D 3/66 464/67.1 |
| 2,673,475 A | * | 3/1954 | Ebsworth | F16H 61/0269 464/67.1 |
| 6,467,595 B2 | * | 10/2002 | Yabe | F16H 45/02 464/67.1 |
| 8,789,670 B2 | * | 7/2014 | Antchak | F16D 7/022 464/67.1 |

FOREIGN PATENT DOCUMENTS

JP  2013256963 A  12/2013

* cited by examiner

*Primary Examiner* — Greg Binda
(74) *Attorney, Agent, or Firm* — United IP Counsellors, LLC (57) ABSTRACT

A damper device includes a retaining plate, a plurality of first spring members and an output plate. The retaining plate has an annular shape. The plurality of first spring members are held by the retaining plate. The output plate is elastically coupled to the retaining plate through the plurality of first spring members. The retaining plate is circumferentially divided into a plurality of divided retaining plate pieces.

7 Claims, 10 Drawing Sheets

DAMPER DEVICE

CROSS-REFERENCE TO RELATED APPLICATIONS

This application claims priority to Japanese Patent Application No. 2016-081686 filed on Apr. 15, 2016, the entirety of which is hereby incorporated by reference in its entirety.

BACKGROUND

Technical Field

The present disclosure relates to a damper device.

Background Information

A torque converter is equipped with a lock-up device for directly transmitting a torque from a front cover to a turbine. Moreover, the lock-up device includes a damper device for attenuating vibration of an engine. The damper device includes torsion springs and a retaining plate holding the torsion springs, and a driven plate (see Japan Laid-open Patent Application Publication No. 2013-256963).

BRIEF SUMMARY

Cost reduction has been demanded for the damper device constructed as described above. It is an object of the present disclosure to provide a damper device that can be produced at low cost.

A damper device according to an aspect of the present disclosure includes a retaining plate, a plurality of first spring members and an output plate. The retaining plate has an annular shape. The plurality of first spring members are held by the retaining plate. The output plate is elastically coupled to the retaining plate through the plurality of first spring members. The retaining plate is circumferentially divided into a plurality of divided retaining plate pieces.

Because of its annular shape, the retaining plate has been formed by boring the middle part of a disc member. Additionally, the removed middle part has been discarded as a waste. By contrast, the retaining plate in the present disclosure is divided into the plurality of divided retaining plate pieces. Hence, each of the divided retaining plate pieces can be made of a plate member. With this construction, wastes are not resulted from the divided retaining plate pieces unlike a well-known retaining plate, whereby the damper device can be produced at low cost.

Additionally, when failures such as scratches or collision marks occur in a retaining plate, such retaining plate has been entirely discarded. By contrast, the retaining plate in the present disclosure is divided into the plurality of divided retaining plate pieces. Hence, when failures such as scratches or collision marks occur in part of the retaining plate, it is only required to discard the divided retaining plate piece in which the failures occur. In other words, it is not required to entirely discard the retaining plate. Thus, the damper device can be produced at low cost.

The plurality of divided retaining plate pieces may each include a fixture attachment hole. According to this construction, the respective divided retaining plate pieces, in which the first spring members are assembled, can be attached to a fixture. While being set on the fixture, the respective divided retaining plate pieces can be attached to another member such as a piston plate. Therefore, even when tensions of the first spring members act on the respective divided retaining plate pieces, the divided retaining plate pieces can keep their positions with each other while being appropriately disposed.

The damper device may further include a plurality of second spring members. The plurality of divided retaining plate pieces may each include an extending part extending radially inside. The extending part may include a spring accommodation part and the fixture attachment hole. The spring accommodation part accommodates each of the plurality of second spring members.

The retaining plate may be configured to be fixed to an input plate. Additionally, the plurality of divided retaining plate pieces may each include a fastener attachment hole so as to be fixed to the input plate. According to this construction, with the fastener attachment holes, the respective divided retaining plates can be fixed to the input plate by rivets or so forth.

The plurality of divided retaining plate pieces may each include a pair of divided engaging parts on both circumferential ends thereof. The pair of divided engaging parts each makes contact with one end surface of each of the plurality of first spring members.

The damper device may further include a support plate. The support plate is rotatable relatively to the retaining plate and the output plate. Additionally, the support plate supports the plurality of first spring members from radially outside. The plurality of first spring members may each include a low stiffness coil spring and a high stiffness coil spring. The high stiffness coil spring has a higher torsional stiffness than the low stiffness coil spring. The support plate may include a plurality of second engaging parts each disposed circumferentially between the low stiffness coil spring and the high stiffness coil spring.

Overall, the damper device according to the present disclosure can be produced at low cost.

BRIEF DESCRIPTION OF THE DRAWINGS

Referring now to the attached drawings which form a part of this original disclosure.

DETAILED DESCRIPTION OF EMBODIMENTS

Figure 1:
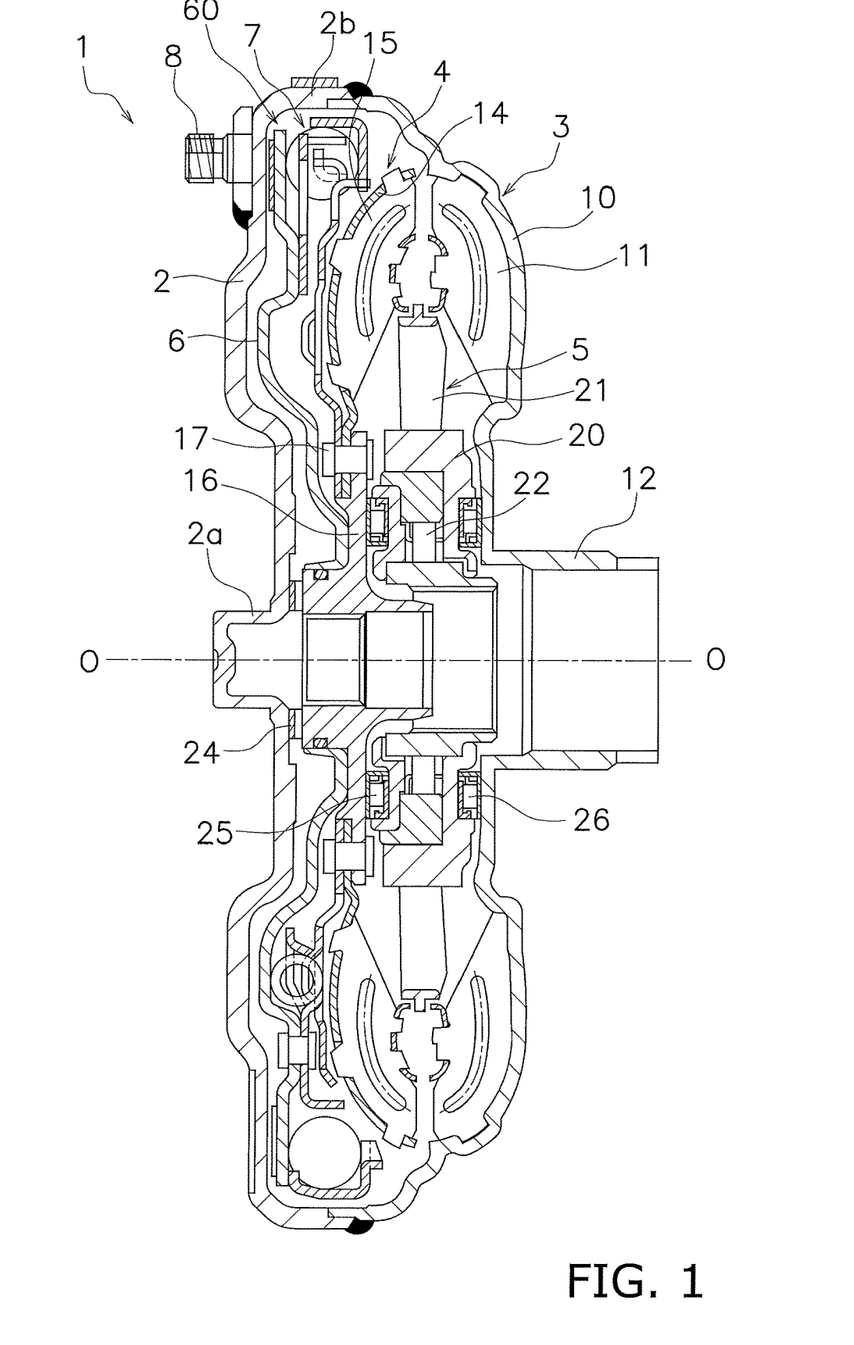
FIG. 1 is a cross-sectional view of a torque converter.

FIG. 1 is a partial cross-sectional view of a torque converter 1 including a damper device as a preferred embodiment of the present disclosure. In FIG. 1, an engine (not shown in the drawing) is disposed on the left side whereas a transmission (not shown in the drawing) is disposed on the right side. Line O-O depicted in FIG. 1 indicates a rotational axis O of both the torque converter 1 and the damper device. In the following explanation, the term "circumferential direction" indicates a circumferential direction of an imaginary circle about the rotational axis O. The term "radial direction" indicates a radial direction of the imaginary circle about the rotational axis O.

<Torque Converter>

The torque converter 1 is a device for transmitting a torque from a crankshaft of the engine to an input shaft of the transmission, and is coupled to an engine-side member through a flexible plate (not shown in the drawings). The torque converter 1 includes a front cover 2, an impeller 3, a turbine 4, a stator 5, a piston plate 6 and a damper device 7.

<Front Cover>

The front cover 2 is a disc-shaped member. The front cover 2 is provided with a center boss 2a on its inner peripheral end. The front cover 2 is also provided with an outer peripheral tubular part 2b on its outer peripheral part. The outer peripheral tubular part 2b extends axially toward the transmission. The center boss 2a is a cylindrical member extending in the axial direction, and is inserted into a center hole of the crankshaft. A plurality of bolts 8 are fixed to the outer peripheral part of the front cover 2, while being aligned at equal intervals in the circumferential direction. The outer peripheral part of the flexible plate is fixed to the front cover 2 by nuts screwed onto the bolts 8.

<Impeller>

The impeller 3 is mainly composed of an impeller shell 10, a plurality of impeller blades 11 fixed to the inside of the impeller shell 10, and an impeller hub 12 fixed to the inner peripheral part of the impeller shell 10. The outer peripheral edge of the impeller shell 10 is welded to the tip of the outer peripheral tubular part 2b of the front cover 2.

<Turbine>

The turbine 4 is disposed axially in opposition to the impeller 3. The turbine 4 is mainly composed of a turbine shell 14, a plurality of turbine blades 15 fixed to the impeller-side surface of the turbine shell 14, and a turbine hub 16 fixed to the inner peripheral edge of the turbine shell 14. The turbine shell 14 and the turbine hub 16 are fixed by a plurality of rivets 17. Additionally, the turbine hub 16 is provided with splines on its inner peripheral surface. The splines are engaged with the input shaft of the transmission.

<Stator>

The stator 5 is a mechanism for regulating the flow of hydraulic oil returning from the turbine 4 to the impeller 3. The stator 5 is disposed between the inner peripheral part of the impeller 3 and that of the turbine 4. The stator 5 is mainly composed of a stator shell 20 having an annular shape and a plurality of stator blades 21 mounted to the outer peripheral surface of the stator shell 20. The stator shell 20 is supported by a tubular stationary shaft (not shown in the drawings) through a one-way clutch 22. The stationary shaft extends between the outer peripheral surface of the input shaft of the transmission and the inner peripheral surface of the impeller hub 12.

A thrust washer 24 is disposed axially between the inner peripheral part of the front cover 2 and the turbine hub 16. Additionally, a thrust bearing 25 is disposed axially between the turbine hub 16 and the inner peripheral part of the stator 5, whereas a thrust bearing 26 is disposed axially between the stator 5 and the impeller 3.

<Lock-up Device>

Figure 2:
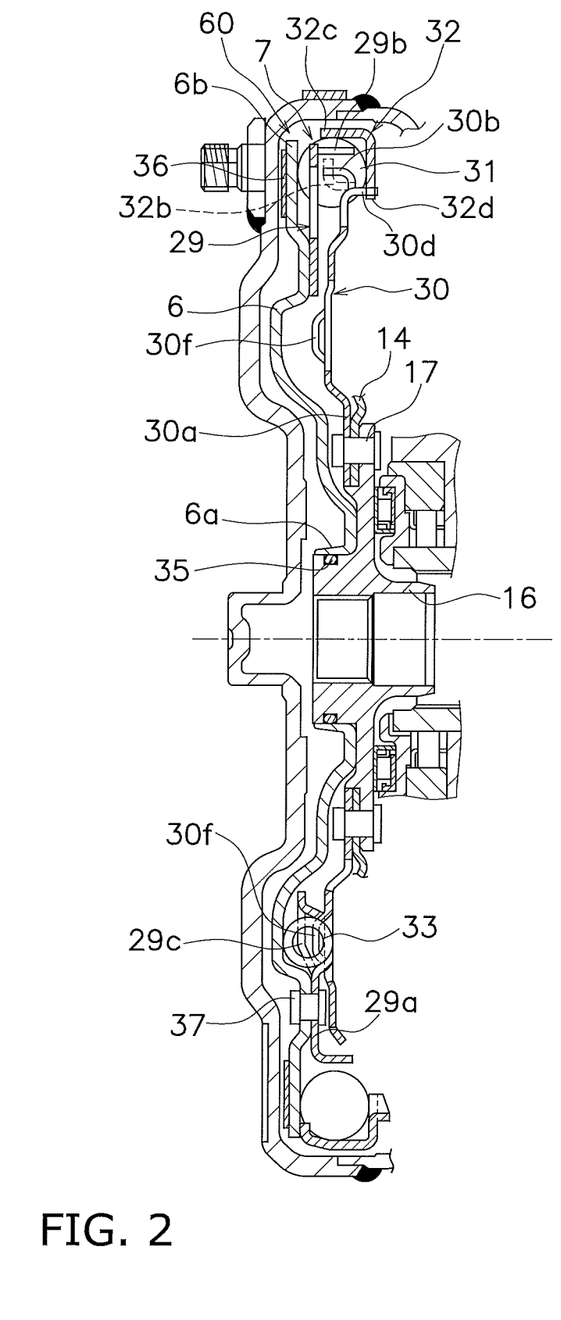
FIG. 2 is a cross-sectional view of a lock-up device.

A lock-up device 60 is a mechanism disposed between the front cover 2 and the turbine 4 so as to mechanically couple both components. As shown in FIG. 2, the lock-up device 60 includes the piston plate 6, composing part of a clutch portion, and the damper device 7.

<Piston Plate>

The piston plate 6 is a member for clutch engagement and disengagement, and has a disc shape with a center hole. The piston plate 6 is provided with an inner peripheral tubular part 6a on its inner peripheral edge. The inner peripheral tubular part 6a extends axially toward the engine. The inner peripheral tubular part 6a is supported by the outer peripheral surface of the engine-side part of the turbine hub 16, and is thereby movable in both the rotational direction and the axial direction. It should be noted that an annular seal ring 35 is mounted to the outer peripheral surface of the engine-side part of the turbine hub 16, and makes contact with the inner peripheral surface of the inner peripheral tubular part 6a. With this construction, axial sealing is made on the inner peripheral edge of the piston plate 6.

The piston plate 6 is provided with a friction coupling part 6b on its outer peripheral part. The friction coupling part 6b is an annular part having a predetermined length in the radial direction. A friction facing 36 having an annular shape is adhered to the front cover 2-side surface of the friction coupling part 6b. Thus, the piston plate 6 and the flat friction surface of the front cover 2 compose the clutch portion of the damper device 7.

<Damper Device>

Figure 3:
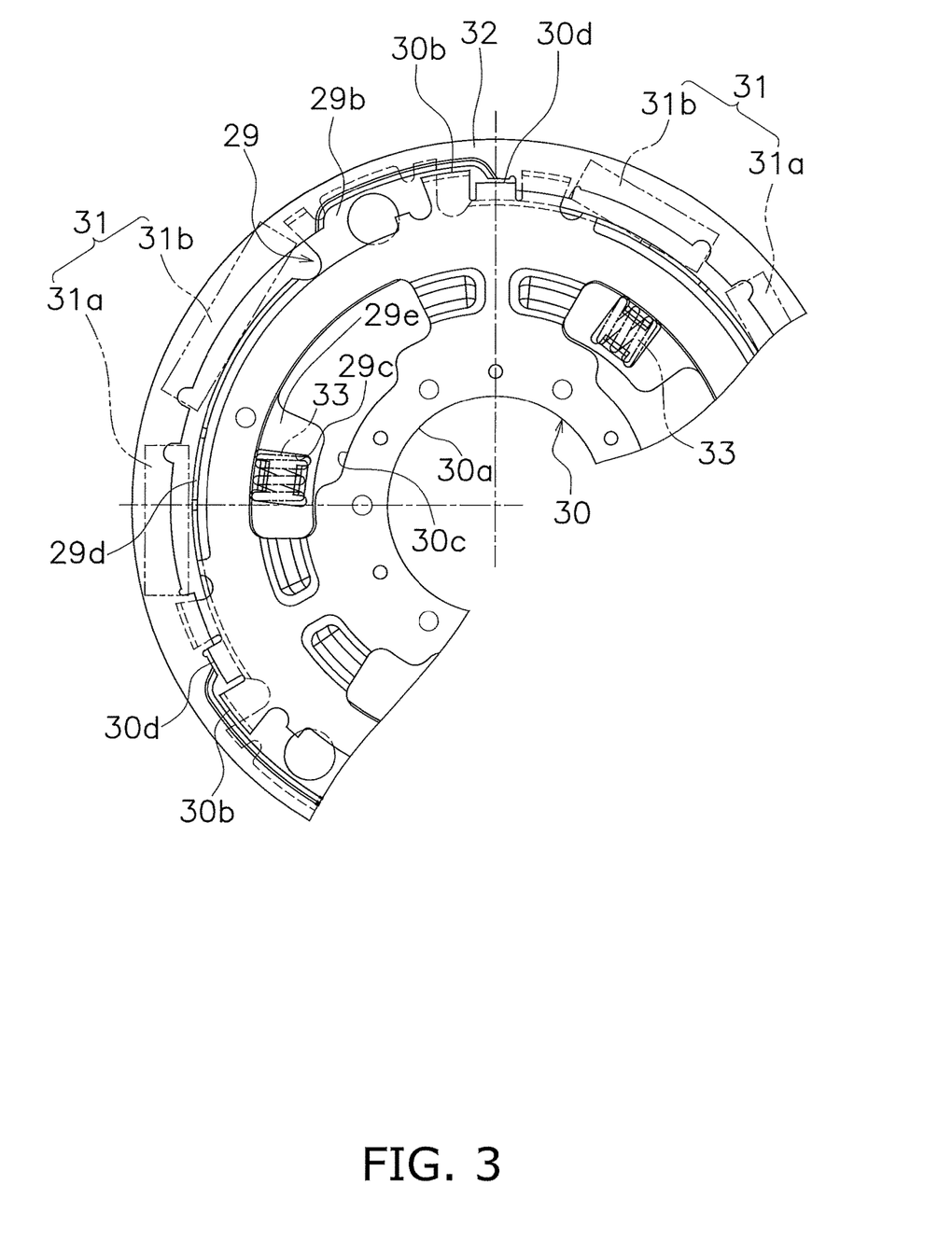
FIG. 3 is a front view of a damper device.

As shown in FIGS. 2 and 3, the damper device 7 includes a retaining plate 29, a driven plate 30 (exemplary output plate), a plurality of outer peripheral side torsion springs 31 (exemplary first spring members), a support plate 32 and a plurality of inner peripheral side torsion springs 33 (exemplary second spring members). It should be noted that FIG. 2 is a diagram showing the lock-up device 60 extracted from FIG. 1, whereas FIG. 3 is a front view of the damper device 7. FIG. 3 shows the damper device 7 without showing part of its constituent members, and shows a condition of the damper device 7 at a predetermined torsion angle (of a bending point P1 in FIG. 9 to be described).

<Retaining Plate>

Figures 4A, 4B, 4C:
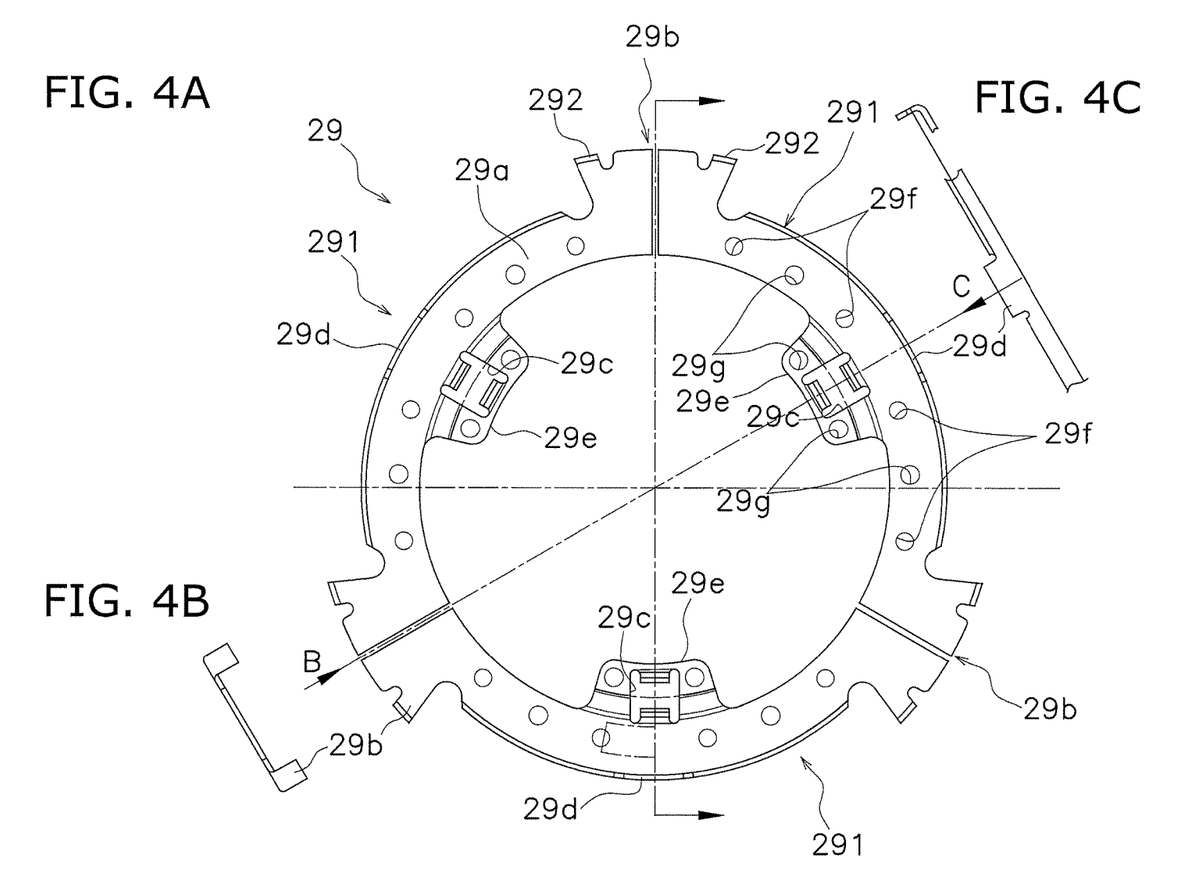
FIG. 4A is a front view of a retaining plate.
FIG. 4B is a view of a retaining plate shown in arrow B.
FIG. 4C is a view of a retaining plate shown in arrow C.

The retaining plate 29 has an annular shape and is disposed on the turbine 4 side of the outer peripheral part of the piston plate 6. As shown in FIG. 4, the retaining plate 29 includes a fixation part 29a, a plurality of first engaging parts 29b, a plurality of spring accommodation parts 29c and a plurality of stopper parts 29d. It should be noted that FIG. 4A is a front view; FIG. 4B is a view shown in arrow B; and FIG. 4C is a view shown in arrow C.

As shown in FIG. 2, the fixation part 29a is fixed to the piston 6 by rivets 37, while making contact with a lateral surface of the piston plate 6. When described in detail, as shown in FIGS. 4A to 4C, the retaining plate 29 includes a plurality of fastener attachment holes 29f. The fastener attachment holes 29f are provided in the fixation part 29a while being aligned at intervals in the circumferential direction. The retaining plate 29 is fixed to the piston plate 6 by the rivets 37 using the fastener attachment holes 29f.

The first engaging parts 29b extend from the fixation part 29a to the outer peripheral side, while being aligned at equal angular intervals in the circumferential direction. As shown in FIG. 4B, each first engaging part 29b is bent at part (both circumferential ends) of its outer peripheral end toward the turbine. Additionally, each first engaging part 29b is contactable at its both circumferential end surfaces with the circumferential end surfaces of its adjacent two outer peripheral side torsion springs 31.

Each of the spring accommodation parts 29c is provided in each of a plurality of extending parts 29e extending radially inside from the fixation part 29a. The extending parts 29e are aligned at equal angular intervals, and each is disposed circumferentially between adjacent two first engaging parts 29b. Each spring accommodation part 29c is an opening formed by cutting and raising part of each extending part 29e toward the turbine. Each inner peripheral side torsion spring 33 is accommodated in each spring accommodation part 29c.

As shown in FIG. 4C, the stopper parts 29d are formed by bending part of the outer peripheral end of the fixation part 29a toward the turbine, and their circumferential positions overlap with those of the spring accommodation parts 29c.

The retaining plate 29 is circumferentially divided into a plurality of divided retaining plate pieces 291. The retaining plate 29 is divided at the first engaging parts 29b. In other words, each first engaging part 29b is composed of a pair of adjacent divided engaging parts 292. It should be noted that in the present preferred embodiment, the retaining plate 29 is divided into three divided retaining plate pieces 291.

Each divided retaining plate piece 291 includes a plurality of fixture attachment holes 29g. The fixture attachment holes 29g are provided in the fixation part 29a and the extending part 29e. The fixture attachment holes 29g, provided in the fixation part 29a, are circumferentially disposed at an interval. Additionally, each of the fixture attachment holes 29g, provided in the fixation part 29a, is disposed circumferentially between two of the aforementioned fastener attachment holes 29f.

The fixture attachment holes 29g, provided in the extending parts 29e, are disposed radially inside the fastener attachment holes 29f. In the present preferred embodiment, two fixture attachment holes 29g are provided in each extending part 29e. Each pair of fixture attachment holes 29g is disposed such that each spring accommodation part 29c is circumferentially interposed therebetween.

Each divided retaining plate piece 291 includes the aforementioned divided engaging parts 292 on its both circumferential ends. Each pair of adjacent divided engaging parts 292 composes each first engaging part 29b. The respective divided retaining plate pieces 291 have the same shape. Each divided retaining plate piece 291 includes, as described above, the spring accommodation part 29c, the stopper part 29d and the extending part 29e.

<Driven Plate>

Figure 5:
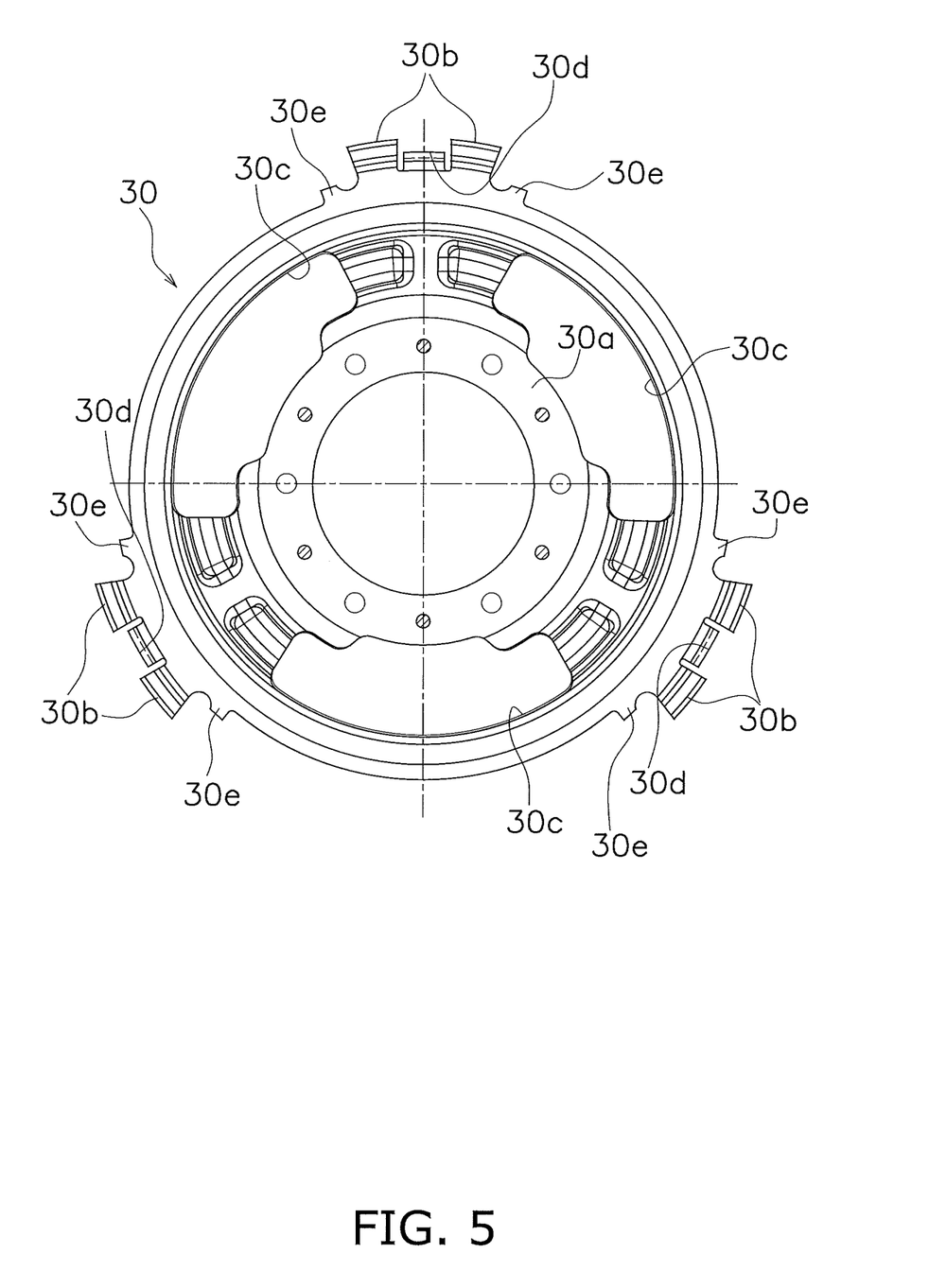
FIG. 5 is a front view of a driven plate.

FIG. 5 is a front view of the driven plate 30. The driven plate 30 has an annular and approximately disc shape, and is disposed on the turbine 4 side of the retaining plate 29. The driven plate 30 includes a fixation part 30a, a plurality of second engaging parts 30b, a plurality of spring actuation parts 30c, a plurality of intermediate stopper parts 30d and a plurality of final stopper parts 30e. The fixation part 30a has an annular shape and is provided on the inner peripheral part of the driven plate 30. The second engaging parts 30b are provided on the outer peripheral part of the driven plate 30. The spring actuation parts 30c are provided on the outer peripheral side of the fixation part 30a.

As shown in FIG. 2, the fixation part 30a is fixed together with the turbine shell 14 to the turbine hub 16 by the rivets 17. The plural second engaging parts 30b are disposed such that a plurality of pairs thereof are circumferentially aligned at equal angular intervals. Each second engaging part 30b has a shape bending toward the front cover 2.

The spring actuation parts 30c are a plurality of circular-arc openings extending in the circumferential direction. Each spring actuation part 30c is provided in a circumferential region in which the second engaging parts 30b are not provided. Each spring accommodation part 29c of the retaining plate 29 and each inner peripheral side torsion spring 33 can be partially accommodated in each spring actuation part 30c. Additionally, each spring actuation part 30c is provided with protruding parts 30f (see FIG. 2) on its both circumferential ends. The protruding parts 30f protrude toward the front cover 2. Each protruding part 30f is contactable with one circumferential end surface of each inner peripheral side torsion spring 33.

Each intermediate stopper part 30d is provided circumferentially between each pair of the second engaging parts 30b. Each intermediate stopper part 30d has a shape bending toward the turbine 4. Additionally, the final stopper parts 30e are provided such that each pair of the second engaging parts 30b is interposed between two of the final stopper parts 30e. The final stopper parts 30e protrude to the outer peripheral side.

<Support Plate>

Figure 6:
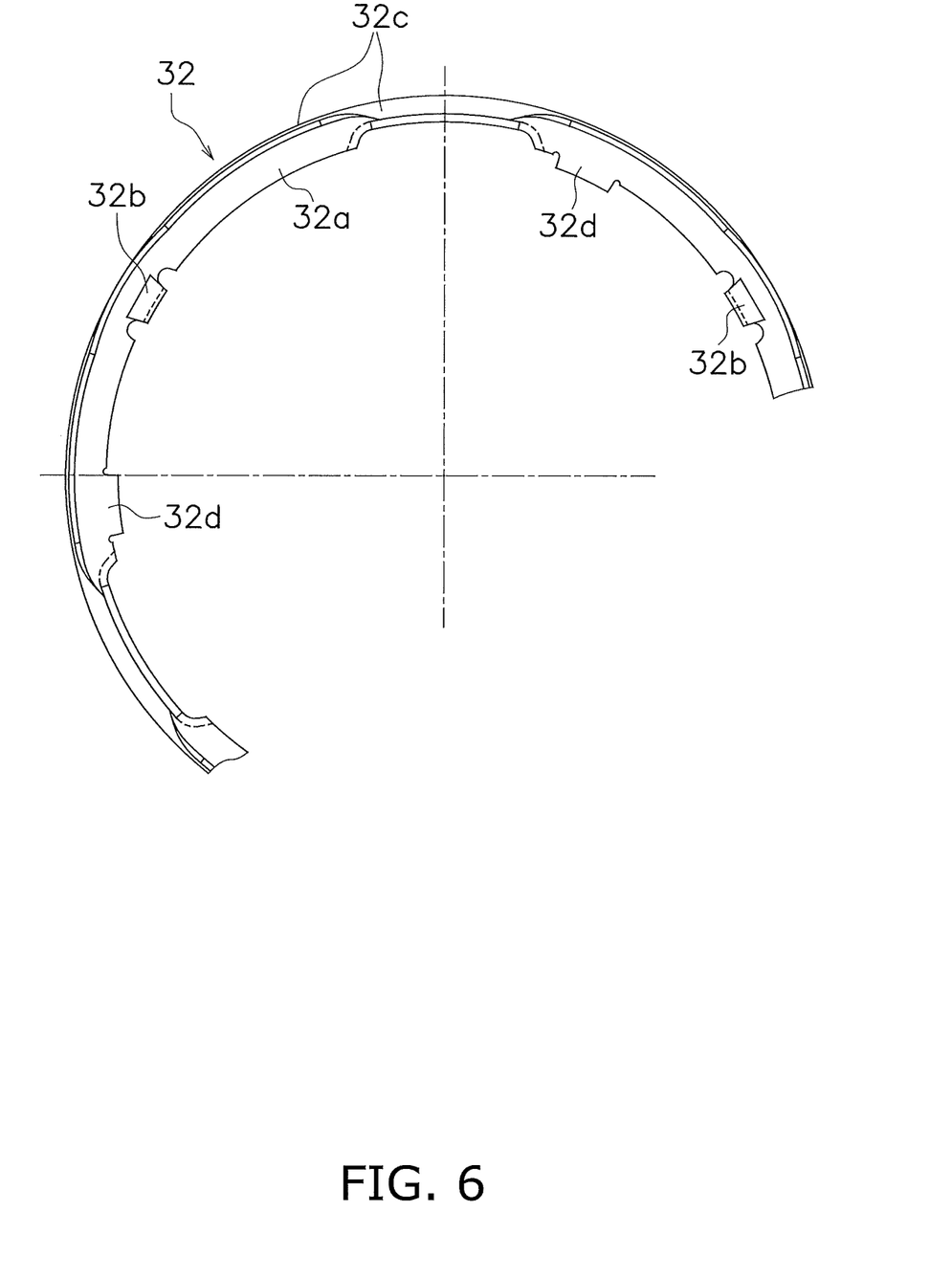
FIG. 6 is a front view of a support plate.

FIG. 6 is a partial front view of the support plate 32. The support plate 32 has an annular shape and includes a disc part 32a, a plurality of second engaging parts 32b, an outer peripheral support part 32c and a plurality of stopper parts 32d. The support plate 32 is disposed while being rotatable relatively to the retaining plate 29 and the driven plate 30 within a predetermined angular range.

The disc part 32a is disposed on the turbine 4 side of the outer peripheral side torsion springs 31, and together with the piston plate 6, restricts the outer peripheral side torsion springs 31 from axially moving. The plural second engaging parts 32b extend from the disc part 32a to the inner peripheral side, then further extend toward the front cover 2, and are bent at their tips to the outer peripheral side. One pair of coil springs, composing each outer peripheral side torsion spring 31, is disposed such that each second engaging part 32b is interposed therebetween. The outer peripheral support part 32c extends toward the front cover 2 from the outer peripheral part of the disc part 32a, and restricts the outer peripheral side torsion springs 31 from radially moving. The stopper parts 32d are formed by extending the inner peripheral part of the disc part 32a to the further inner peripheral side. Each stopper part 32d is disposed away from each second engaging part 32b at a predetermined angular interval in one direction.

<Outer Peripheral Side Torsion Spring>

Three outer peripheral side torsion springs 31 are provided in this example. As shown in FIG. 3, each outer peripheral side torsion spring 31 is composed of a low stiffness coil spring 31a and a high stiffness coil spring 31b. The high stiffness coil spring 31b has a higher torsional stiffness than the low stiffness coil spring 31a. Additionally, as described above, the opposed end surfaces of the low and high stiffness coil springs 31a and 31b make contact with each second engaging part 32b, whereby both coil springs 31a and 31b act in series. It should be noted that both coil springs 31a and 31b have longer free lengths than each inner torsion spring 33.

<Method of Assembling Lock-up Device>

Figure 7:
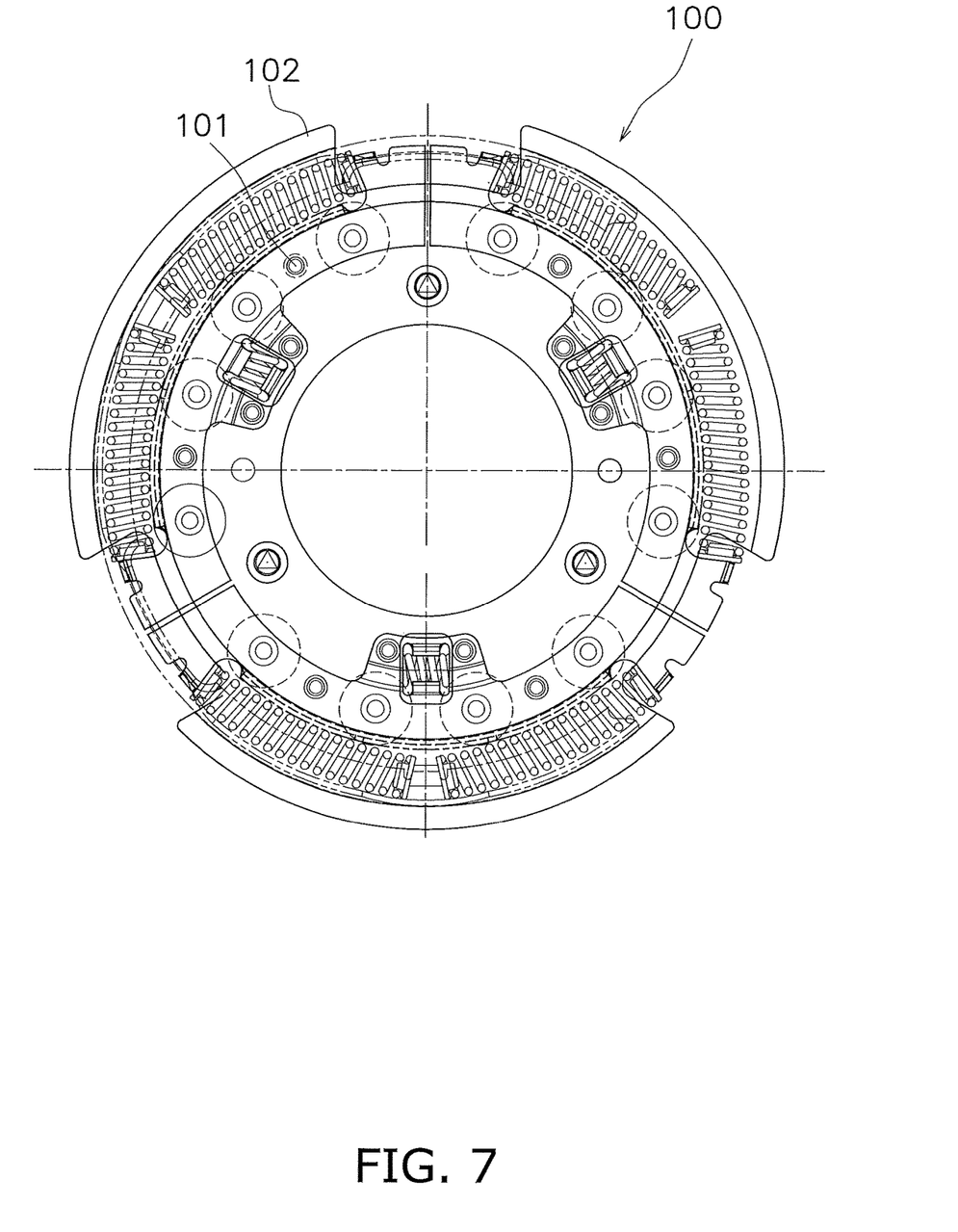
FIG. 7 is a front view of the damper device attached to a fixture.
Figure 8:
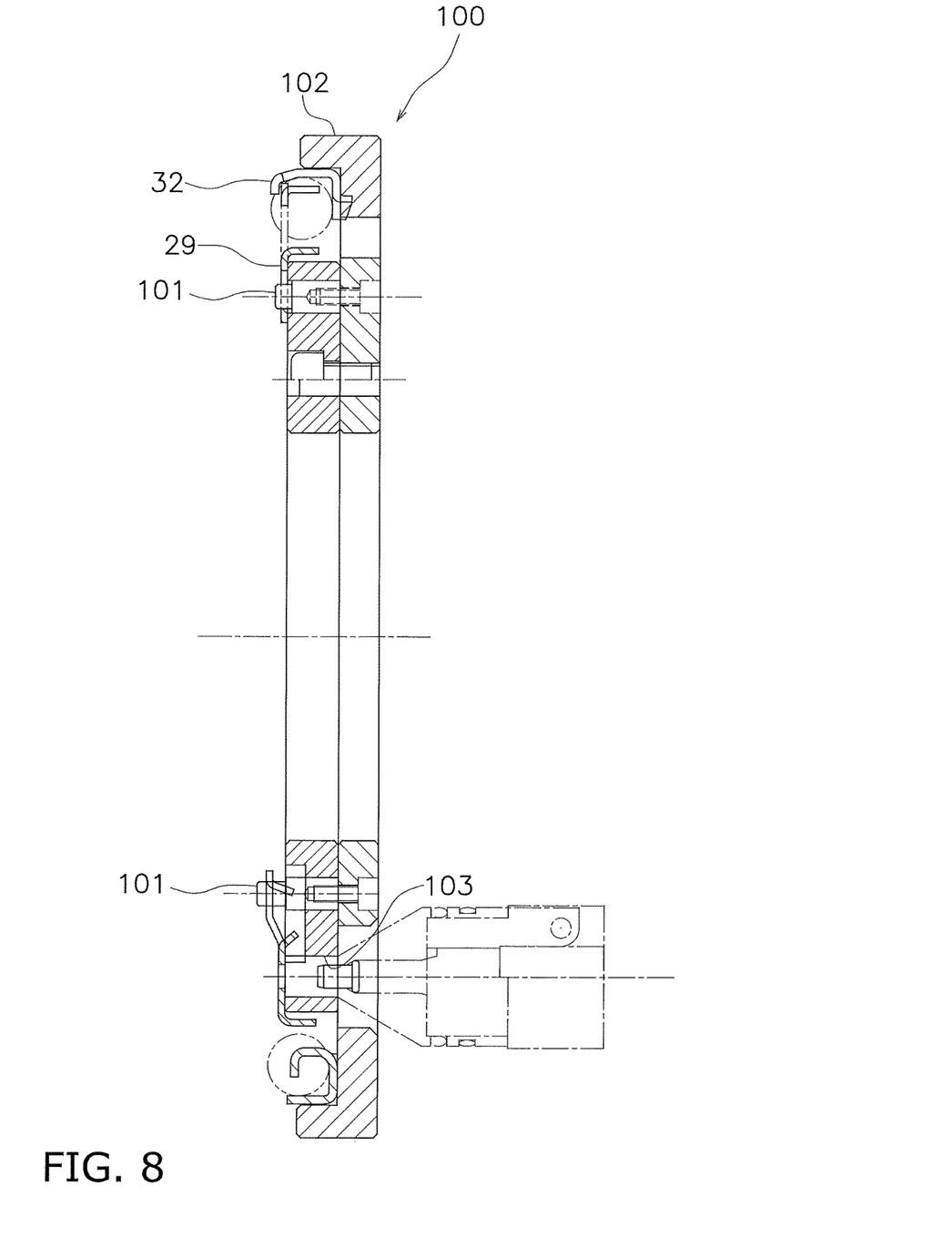
FIG. 8 is a cross-sectional view of the damper device attached to the fixture.

As shown in FIGS. 7 and 8, a fixture 100 is firstly prepared. The fixture 100 includes a plurality of pins 101. Additionally, the fixture 100 includes an outer wall part 102 having an annular shape. The support plate 32 is disposed along the inner peripheral surface of the outer wall part 102. It should be noted that the inner diameter of the outer wall part 102 is approximately equal to the outer diameter of the support plate 32. Therefore, when disposed inside the outer wall part 102, positioning of the support plate 32 is made.

Next, the outer peripheral side torsion springs 31 are disposed along the support plate 32. Then, the respective divided retaining plate pieces 291 are set on the fixture 100. When described in detail, the pins 101 of the fixture 100 are fitted into the fixture attachment holes 29g of the divided retaining plate pieces 291, whereby positioning of the divided retaining plate pieces 291 is made.

In the condition that the support plate 32 and the respective divided retaining plate pieces 291 are set on the fixture 100 as described above, the piston plate 6 is put on these components combined as an assembly. Then, the respective divided retaining plate pieces 291 are fixed to the piston plate 6 by the rivets 37. It should be noted that the fixture 100 includes through holes 103 in which the rivets 37 are disposed. Next, the assembly is detached from the fixture 100, and is incorporated into the torque converter 1.

<Actions>

When engine rotation is in a low speed range, the piston plate 6 is located on the turbine 4 side, because the piston plate 6 is moved toward the turbine 4 by difference in hydraulic pressure between the space located on the front cover 2 side of the piston plate 6 and the space located on the turbine 4 side of the front cover 2. Therefore, the friction facing 36 is separated from the front cover 2, whereby a lock-up state is released.

When the engine rotation speeds up, the piston plate 6 is, contrarily to the above, moved toward the front cover 2, whereby the friction facing 36 is pressed onto the friction surface of the front cover 2. As a result, a torque of the front cover 2 is transmitted from the piston plate 6 to the driven plate 30 through the retaining plate 29 and the outer peripheral side and inner peripheral side torsion springs 31 and 33. The torque is further transmitted from the driven plate 30 to the turbine 4.

In the lock-up state described above, torsional vibration is absorbed and attenuated by the outer peripheral side and inner peripheral side torsion springs 31 and 33. In this regard, explanation will be hereinafter provided.

Figure 9:
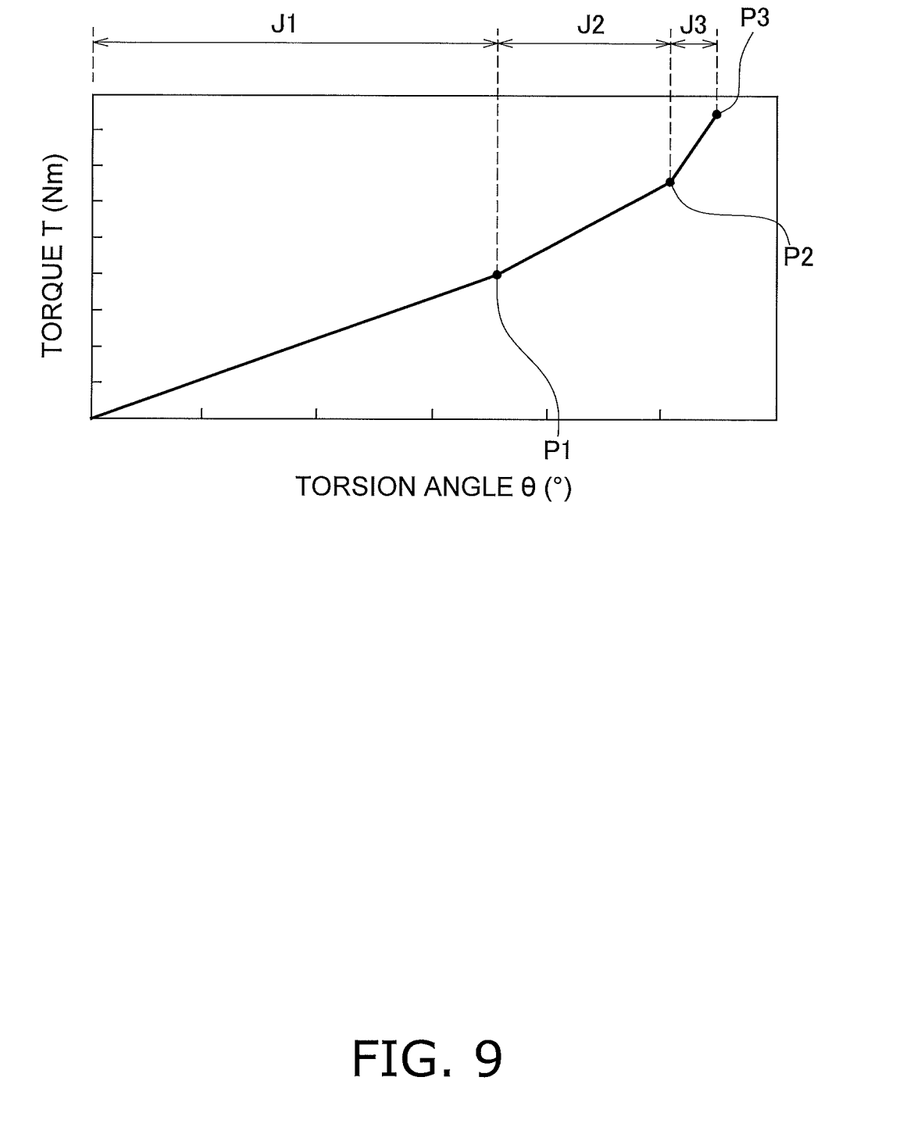
FIG. 9 is a chart showing torsional characteristics of the damper device.

FIG. 9 is a chart showing torsional characteristics exerted when the respective torsion springs 31 and 33 are actuated. On the other hand, FIGS. 10A to 10D are model diagrams showing a series of actuated states of the respective torsion springs 31 and 33 in the respective stages of the torsional characteristics.

When torsional vibration is inputted from the front cover 2 and causes relative rotation between the retaining plate 29 and the driven plate 30, the outer peripheral side torsion springs 31 are firstly compressed between the retaining plate 29 and the driven plate 30 in a rotational direction. In this condition (that occurs in a region indicated by J1 in FIG. 9 and corresponds to FIG. 10A), only the low stiffness coil springs 31a are compressed. It should be noted that depending on stiffness settings for the low stiffness and high stiffness coil springs 31a and 31b, compression of the high stiffness coil springs 31b can begin in the region J1.

Figure 10A:
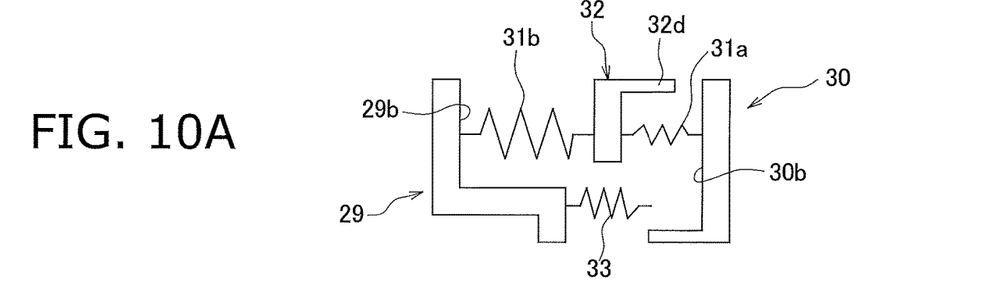
FIG. 10A, FIG. 10B, FIG. 10C, and FIG. 10D are model diagrams showing a series of states of the damper device in action.
Figure 10B:
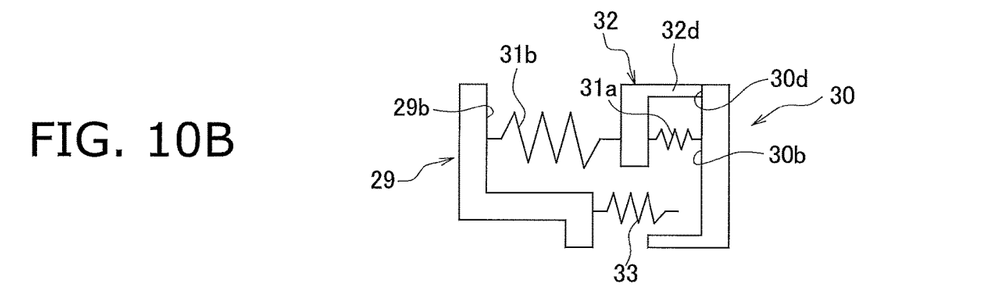

Specifically, the low stiffness and high stiffness coil springs 31a and 31b are compressed between the first engaging parts 29b of the retaining plate 29 and the second engaging parts 30b of the driven plate 30 in the rotational direction. At this time, the support plate 32 is rotated together with both types of coil springs 31a and 31b, and is rotated relatively to the retaining plate 29 and the driven plate 30.

Then, when a torsion angle θ increases, the stopper parts 32d of the support plate 32 make contact with the intermediate stopper parts 30d of the driven plate 30 before coiled parts of each low stiffness coil spring 31a are closely contacted to each other, whereby relative rotation between the support plate 32 and the driven plate 30 is prevented. This condition corresponds to the first bending point P1 in FIG. 9. Additionally, this condition is shown in FIG. 3 and corresponds to FIG. 10B.

When the torsion angle θ further increases beyond the first bending point P1, only the high stiffness coil springs 31b are compressed because relative rotation between the support plate 32 and the driven plate 30 is prevented. This condition occurs in a region J2 indicated in FIG. 9. This condition also corresponds to a transitional condition from FIG. 10B to FIG. 10C.

Figure 10C:
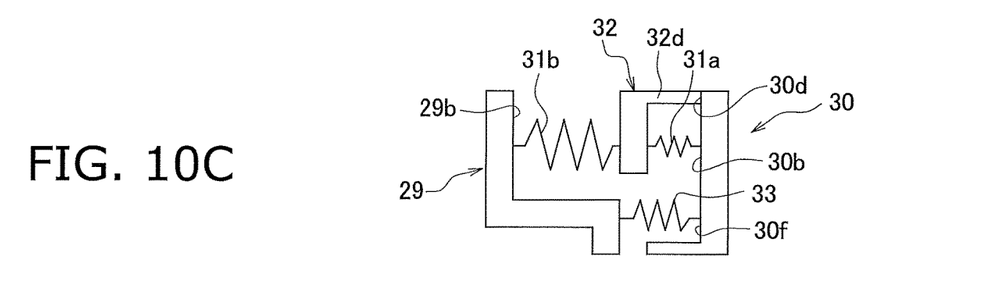
Figure 10D:
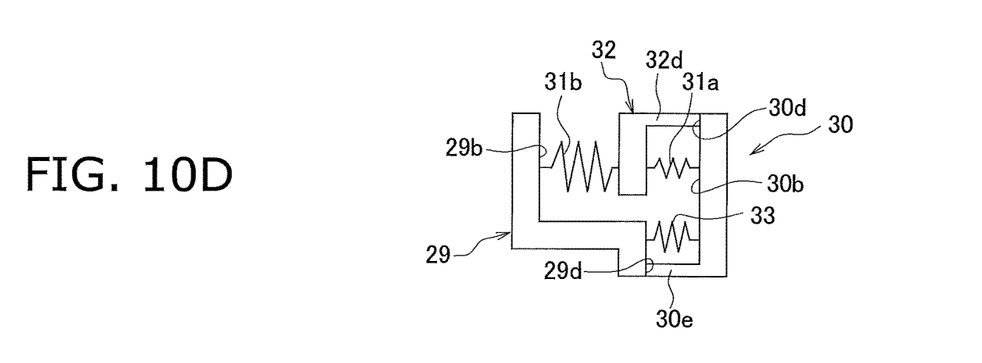

When the torsional angle θ further increases, each inner peripheral side torsion spring 33, accommodated in each spring accommodation part 29c of the retaining plate 29, makes contact with the protruding part 30f on one end surface of each opening (each spring actuation part 30c) of the driven plate 30 (this condition corresponds to a second bending point P2 in FIG. 9 and FIG. 10C). At this point of time, compression of the inner peripheral side torsion springs 33 begins.

At and after the second bending point P2, the high stiffness coil springs 31b and the inner peripheral side torsion springs 33 are compressed. This condition occurs in a region J3 indicated in FIG. 9 and corresponds to FIG. 10D. Then finally, the stopper parts 29d of the retaining plate 29 make contact with the final stopper parts 30e of the driven plate 30, whereby relative rotation between the retaining plate 29 and the driven plate 30 is prevented (this condition corresponds to a point P3 in FIG. 9).

<Modifications>

One preferred embodiment of the present disclosure has been described above. However, the present disclosure is not limited to the aforementioned preferred embodiment, and a variety of changes can be made without departing from the scope of the present disclosure. For example, in the aforementioned preferred embodiment, the retaining plate 29 is divided into three divided retaining plate pieces 291. However, the number of pieces to be obtained by dividing the retaining plate 29 is not limited to three.

Additionally, in the aforementioned preferred embodiment, the fixture attachment holes 29g are provided in both of the fixation part 29a and the extending parts 29e. However, the fixture attachment holes 29g may be provided in only either of the fixation part 29a and the extending parts 29e. Moreover, the number of the fixture attachment holes 29g is not limited to that in the aforementioned preferred embodiment.

What is claimed is:
1. A damper device comprising:
   a retaining plate having an annular shape;
   a plurality of first spring members held radially outside of the retaining plate;
   an output plate elastically coupled to the retaining plate through the plurality of first spring members; and
   a support plate rotatable relative to the retaining plate and the output plate,
   the retaining plate circumferentially divided into a plurality of divided retaining plate pieces.
2. The damper device according to claim 1, wherein each of the plurality of divided retaining plate pieces includes a fixture attachment hole.
3. The damper device according to claim 2, wherein
   the retaining plate is configured to be fixed to an input plate, and
   each of the plurality of divided retaining plate pieces includes a fastener attachment hole so as to be fixed to the input plate.

4. The damper device according to claim 1, wherein each of the plurality of divided retaining plate pieces includes a pair of divided engaging parts on both circumferential ends thereof, each of the pair of divided engaging parts contacting one end surface of each of the plurality of first spring members.

5. The damper device according to claim 1, wherein
a first end surface of each of the plurality of first spring members contacts the retaining plate, and
a second end surface of each of the plurality of first spring members contacts the support plate.

6. A damper device comprising:
a retaining plate having an annular shape;
a plurality of first spring members held by the retaining plate;
an output plate elastically coupled to the retaining plate through the plurality of first spring members;
a plurality of second spring members, wherein
the retaining plate circumferentially divided into a plurality of divided retaining plate pieces,
each of the plurality of divided retaining plate pieces includes a fixture attachment hole,
each of the plurality of divided retaining plate pieces includes an extending part extending radially inside, and
the extending part includes a spring accommodation part and the fixture attachment hole, the spring accommodation part accommodating each of the plurality of second spring members.

7. A damper device comprising:
a retaining plate having an annular shape;
a plurality of first spring members held by the retaining plate;
an output plate elastically coupled to the retaining plate through the plurality of first spring members;
a support plate rotatable relative to the retaining plate and the output plate, the support plate supporting the plurality of first spring members from radially outside, wherein
the retaining plate circumferentially divided into a plurality of divided retaining plate pieces,
each of the plurality of first spring members includes a low stiffness coil spring and a high stiffness coil spring, the high stiffness coil spring having a higher torsional stiffness than the low stiffness coil spring, and
the support plate includes a plurality of second engaging parts, each of the plurality of second engaging parts disposed circumferentially between the low stiffness coil spring and the high stiffness coil spring.

* * * * *